United States Patent [19]

Duprez

[11] Patent Number: 4,502,451
[45] Date of Patent: * Mar. 5, 1985

[54] DIESEL FUEL CONTROL APPARATUS AND SYSTEM

[75] Inventor: Wayne R. Duprez, Waltham, Mass.

[73] Assignee: Standard-Thomson Corporation, Waltham, Mass.

[*] Notice: The portion of the term of this patent subsequent to Jun. 19, 2001 has been disclaimed.

[21] Appl. No.: 527,989

[22] Filed: Aug. 31, 1983

Related U.S. Application Data

[63] Continuation of Ser. No. 411,257, Aug. 25, 1982, Pat. No. 4,454,848, which is a continuation-in-part of Ser. No. 303,486, Sep. 18, 1981, Pat. No. 4,452,213, which is a continuation of Ser. No. 57,398, Jul. 13, 1979, abandoned.

[51] Int. Cl.$^3$ .................. F02M 55/00; F02M 31/00
[52] U.S. Cl. .................. 123/516; 123/514; 123/557
[58] Field of Search ............. 123/512, 511, 513, 514, 123/515, 516, 517, 518

[56] References Cited

U.S. PATENT DOCUMENTS

| 1,909,390 | 5/1933 | Ball | 123/516 |
| 2,222,274 | 11/1940 | Antonsen | 123/516 |
| 2,599,699 | 6/1952 | Dilworth | 123/516 |
| 4,117,817 | 10/1978 | Nishida | 123/516 |
| 4,320,734 | 3/1982 | Balachandran | 123/516 |
| 4,452,213 | 6/1984 | Duprez | 123/516 |
| 4,454,848 | 6/1984 | Duprez | 123/516 |

Primary Examiner—Charles J. Myhre
Assistant Examiner—Carl Stuart Miller
Attorney, Agent, or Firm—Jacox & Meckstroth

[57] ABSTRACT

Diesel fuel control apparatus in a system in which fuel flows to a diesel engine from a fuel tank. A portion of the fuel is consumed by the diesel engine. Excess fuel flows from the diesel engine in a heated condition. The excess fuel has air entrained therein. A diesel fuel filter housing is attached to the diesel fuel control apparatus and is in fluid communication therewith. The diesel fuel control apparatus receives heated fuel and air entrained therein and supplies heated fuel without air therein to mix with fuel flowing from the fuel tank to the fuel filter housing.

7 Claims, 5 Drawing Figures

DIESEL FUEL CONTROL APPARATUS AND SYSTEM

RELATED APPLICATION

This application is a continuation of Application Ser. No. 411,257, filed Aug. 25, 1982, now Pat. No. 4,454,848, which is a continuation-in-part of Application Ser. No. 303,486, filed Sept. 18, 1981, now U.S. Pat. No. 4,452,213 which is a continuation of Application Ser. No. 057,398, filed July 13, 1979, now abandoned.

BACKGROUND OF THE INVENTION

In most diesel engine systems there is a filter device through which fuel must flow to reach the engine. When the engine apparatus is subjected to temperature in the region of zero degrees Fehrenheit and lower, there is a tendency for crystals and solid wax particles to form in the diesel fuel. Such conditions cause clogging of the fuel filter device.

In a conventional diesel engine apparatus only a portion of the fuel pumped to the engine is used, and the excess fuel which flows from the engine contains gas, in the form of entrained air, which is ordinarily vented from the fuel in the fuel tank as the excess fuel with the entrained air therein returns to the fuel tank.

Attempts have been made to mix heated return fuel with fuel flowing from the fuel tank in order to provide fuel to the engine at a temperature which does not permit the formation of wax particles in the fuel, to avoid clogging of the fuel filter. However, the entrained air in the heated return fuel presents a problem, due to the fact that the diesel engine must have sufficient fuel to operate, and excessive air in the fuel robs the engine of fuel necessary for operation.

Various methods have been employed in an attempt to overcome these problems. For example, No. 1 fuel oil is mixed with the conventional No. 2 diesel fuel oil, to provide a fuel in which wax crystallization does not occur so readily in cold weather. This mixing process has not been found to be satisfactory and adds to the expense of the fuel.

U.S. Pat. Nos. 2,881,828 and 3,472,214 show the use of heat exchanger devices to heat the fuel, to avoid wax crystallization. However, such devices may not provide heat to the fuel until a significant period of time has elapsed, and therefore fuel filter clogging may occur with initial operation.

U.S. Pat. No. 3,768,454 shows the use of a fuel tank which has a mixing zone with a temperature responsive valve controlling flow of fuel with respect to the mixing zone. Such a system requires an objectionable special fuel tank.

U.S. Pat. No. 2,599,699 recognizes the problem involved as entrained air flows from the diesel engine with the excess heated fuel. This patent shows a device which attempts to eliminate the air from the heated return fuel prior to mixing of the heated fuel with fuel flowing from the fuel tank. However, the device of this patent employs a fuel return tank which occupies excessive space and which employs baffles to separate air from the heated fuel. This device is therefore not satisfactory for use in the diesel engine system.

It is therefore an object of this invention to provide diesel fuel control apparatus and a system which supplies conventional diesel fuel to a diesel engine at a proper temperature and without wax crystallization therein when the diesel engine apparatus is exposed to low temperatures.

It is another object of this invention to provide such diesel fuel control apparatus which also supplies fuel to a diesel engine at a proper temperature at all environmental temperatures.

It is another object of this invention to provide such diesel fuel control apparatus and a system in which the temperature of the fuel flowing to the diesel engine is sensed by a fuel temperature control device immediately following flow of the diesel fuel through a fuel filter unit, and the temperature control device controls the temperature of fuel flowing to the fuel filter unit. Thus, the temperature of the diesel fuel flowing into the fuel filter is always at a proper temperature for fuel flow through the fuel filter without wax crystallization in the fuel.

It is another object of this invention to provide such diesel fuel control apparatus and a system which does not require a special fuel tank.

It is another object of this invention to provide such a diesel engine fuel control apparatus and a system which does not employ a fuel heater device.

It is another object of this invention to provide such a diesel fuel control apparatus and system in which additional fuel conduit lines are not required in the installation thereof.

It is another object of this invention to provide such diesel fuel control apparatus and a system which can be easily and readily installed in an existing diesel engine apparatus and system.

It is another object of this invention to provide such diesel engine fuel control apparatus and a system which is relatively small in physical size.

It is another object of this invention to provide such diesel engine fuel control apparatus and a system by which air entrained in the heated return fuel is automatically removed from the mixture of heated return fuel and air during flow of the mixture for mixing of the heated return fuel with diesel fuel flowing from the fuel tank.

It is another object of this invention to provide such diesel fuel control apparatus and a system which can be a fixed original part of a diesel engine unit and in combination with a diesel fuel filter unit.

Other objects and advantages of the diesel fuel control apparatus and system of this invention reside in the construction and arrangement of parts, the combination thereof, the method of production, and the mode of operation, as will become more apparent from the following description.

BRIEF SUMMARY OF THE INVENTION

This invention comprises diesel engine fuel control apparatus for use in a diesel system which includes a diesel engine provided with fuel injector means which receives fuel from a fuel tank. The system also includes fuel filter means, fuel conduit means for providing fuel to the fuel injector means, and fuel return means for conducting heated unused fuel from the diesel engine. The heated unused fuel has air entrained therein. The fuel control apparatus includes a housing which is attached to a diesel engine. A fuel filter housing is attached to the housing of the fuel control apparatus and is in direct fluid communication therewith. The fuel control apparatus includes means for mixing heated unused fuel with fuel which flows from the fuel tank, while preventing entrained air in the heated fuel from mixing with the fuel which flows to the diesel engine. The fuel control apparatus also includes thermally responsive fuel control valve means which senses the temperature of the fuel after the fuel flows through the fuel filter and which controls the temperature of the mixture of unused heated fuel and fuel which flows from the fuel tank, as the mixture flows to the fuel filter.

DETAILED DESCRIPTION OF THE INVENTION

Figure 1:
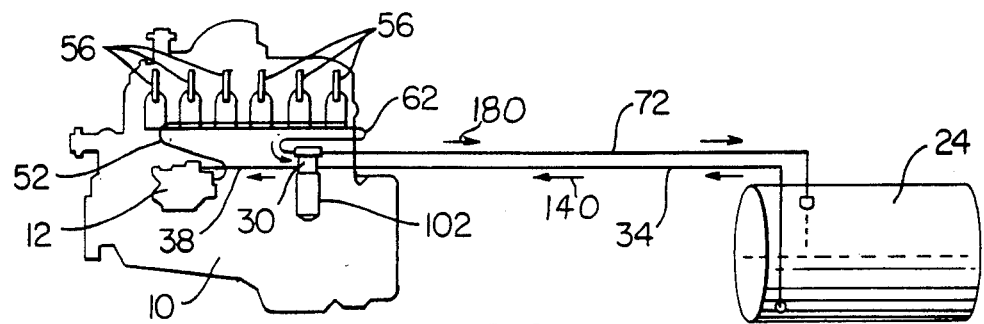
FIG. 1 is a diagrammatic view showing a diesel engine and fuel system which includes fuel control apparatus of this invention fixedly attached to the diesel engine.

FIG. 1 shows a diesel engine 10 provided with a fuel pump 12. Diesel fuel is supplied to the engine 10 from a fuel tank 24. A fuel control housing 30 of the fuel control apparatus of this invention is secured to the diesel engine 10 by means of a bracket 32, shown in FIGS. 2 and 4.

A fuel supply conduit 34 extends from the fuel tank 24 to the fuel control housing 30. The fuel supply conduit 34 is joined to an inlet passage 36 within the lower portion of the fuel control housing 30. A conduit 38 is joined to an outlet passage 42 of the fuel control housing 30 and extends to the fuel pump 12. A conduit 52 extends from the fuel pump 12 to a set of fuel injectors 56 of the diesel engine 10. A conduit 62 leads from the fuel injectors 56 to an inlet passage 66 at the upper portion of the fuel control housing 30. A fuel return conduit 72 is joined to an outlet passage 76 at the upper portion of the fuel control housing 30 and is also joined to the fuel tank 24.

Within the fuel control housing 30 is a fuel control chamber 80, provided with a plurality of vertically oriented spaced-apart guide fins 82. Within the fuel control chamber 80 is a buoyant member 86, which has a valve member 88 attached thereto at the lower portion thereof. The buoyant member 86 is movable upwardly and downwardly within the fuel control chamber 80, and the movement of the buoyant member 80 is guided by the guide fins 82. At the upper portion of the fuel control chamber 80 is an abutment member 89 which limits upward travel of the buoyant member 80. The valve member 88 is movable with movement of the buoyant member 86. The valve member 88 is movable with respect to a passage 90 in the housing 30, for controlling flow of fluid through the passage 90.

The fuel control housing 30 has a threaded stem 100 at the lower portion thereof, to which is threadedly attached a fuel filter housing 102. Seal members 104 provide a sealing action between the fuel filter housing 102 and the fuel control housing 30. The threaded stem 100 has a passage 106 therethrough, for communication between the fuel filter housing 102 and the outlet passage 42. Within the fuel filter housing 102 is a tubular filter element 108, which is seated upon a spring 110 within the fuel filter housing 102. A plug 112 is shown at the bottom end of the fuel filter housing 102 and is removable for draining the fuel filter housing 102.

Within the outlet passage 42 is a thermally responsive actuator 130 which is provided with an actuator stem 134 to which a collar 138 is attached. A helical spring 139 encompasses the actuator stem 34 and engages the collar 138. The spring 139 also engages a portion of the fuel control housing 30 adjacent the passage 94 and urges the actuator stem 134 in a direction away from the passage 94.

OPERATION

The fuel pump 12 creates negative pressure conditions which cause fuel to flow from the fuel tank 24 in the conduit 34 toward the fuel control housing 30, as illustrated by arrows 140. The fuel flows into the inlet passage 36 of the fuel control housing 30 and then flows downwardly into the fuel filter housing 102 and through the filter element 108, as illustrated by arrows 150. The fuel then flows through the passage 106 and into the outlet passage 42. From the outlet passage 42 the fuel flows into the conduit 38, as illustrated by an arrow 146 in FIG. 2, to the fuel pump 12, and then through the conduit 52 to the fuel injectors 56 of the diesel engine 10.

Some of the fuel is then consumed in the diesel engine 10. However, the diesel engine 10 consumes only a portion of the fuel supplied thereto. Excess fuel flows from the fuel injectors 56 through the conduit 62, to the fuel control housing 30. The fuel flowing from the fuel injectors 56 through the conduit 62 is fuel which has been heated by the diesel engine 10. The heated excess fuel flowing in the conduit 62 to the fuel control housing 30, as illustrated by arrows 170, has air and, perhaps, other gases entrained therein. This heated excess fuel and entrained air flows from the conduit 62 into the fuel control chamber 80.

Figure 2:
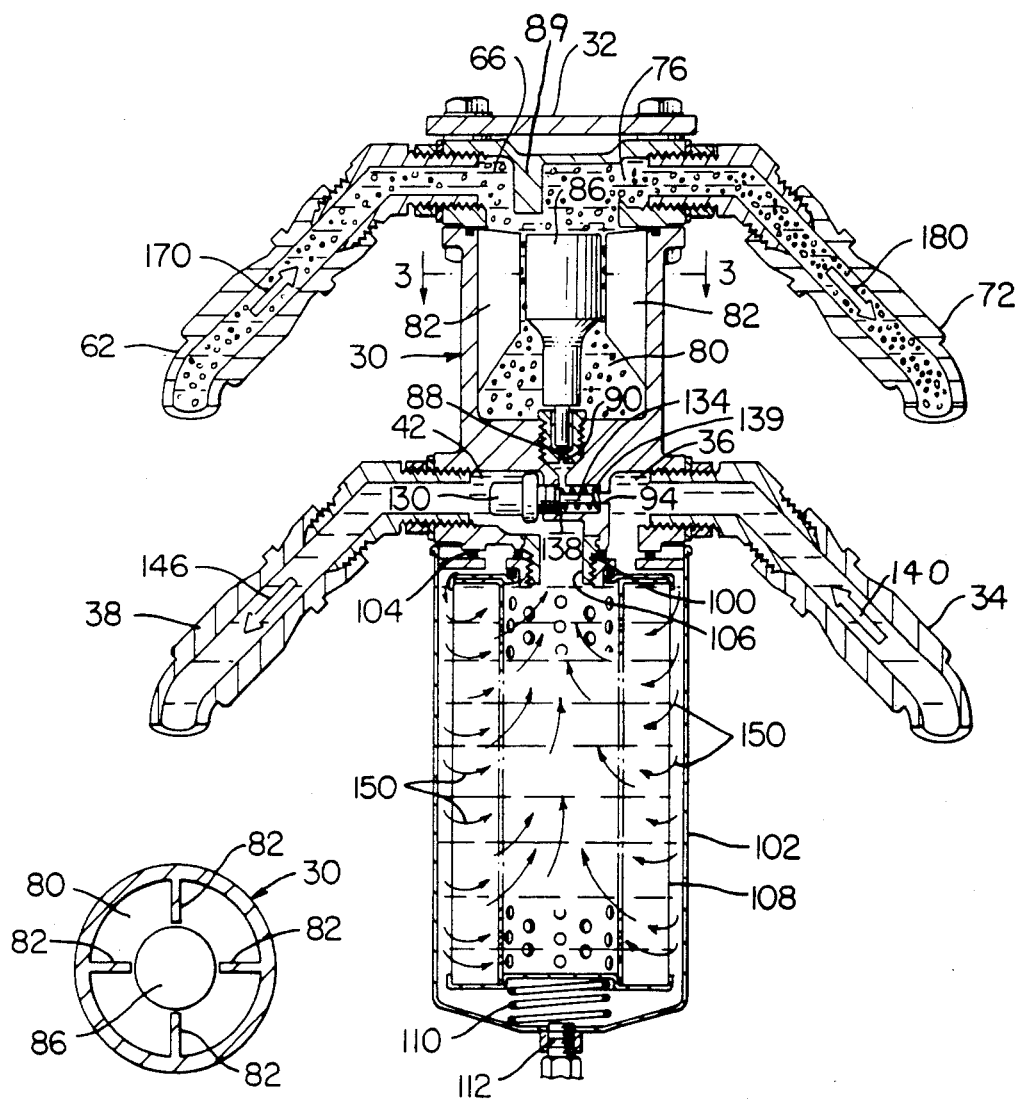
FIG. 2 is a cross-sectional diagrammatic type of view, drawn on a much larger scale than FIG. 1, showing diesel fuel control apparatus of this invention in one of the operating modes thereof and in combination with a diesel fuel filter.
Figure 3:
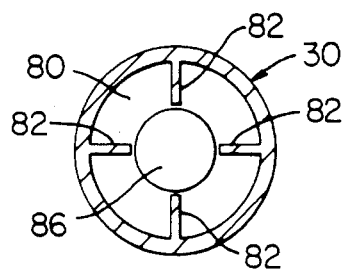
FIG. 3 is a sectional view taken substantially on line 3—3 of FIG. 2.
Figure 4:
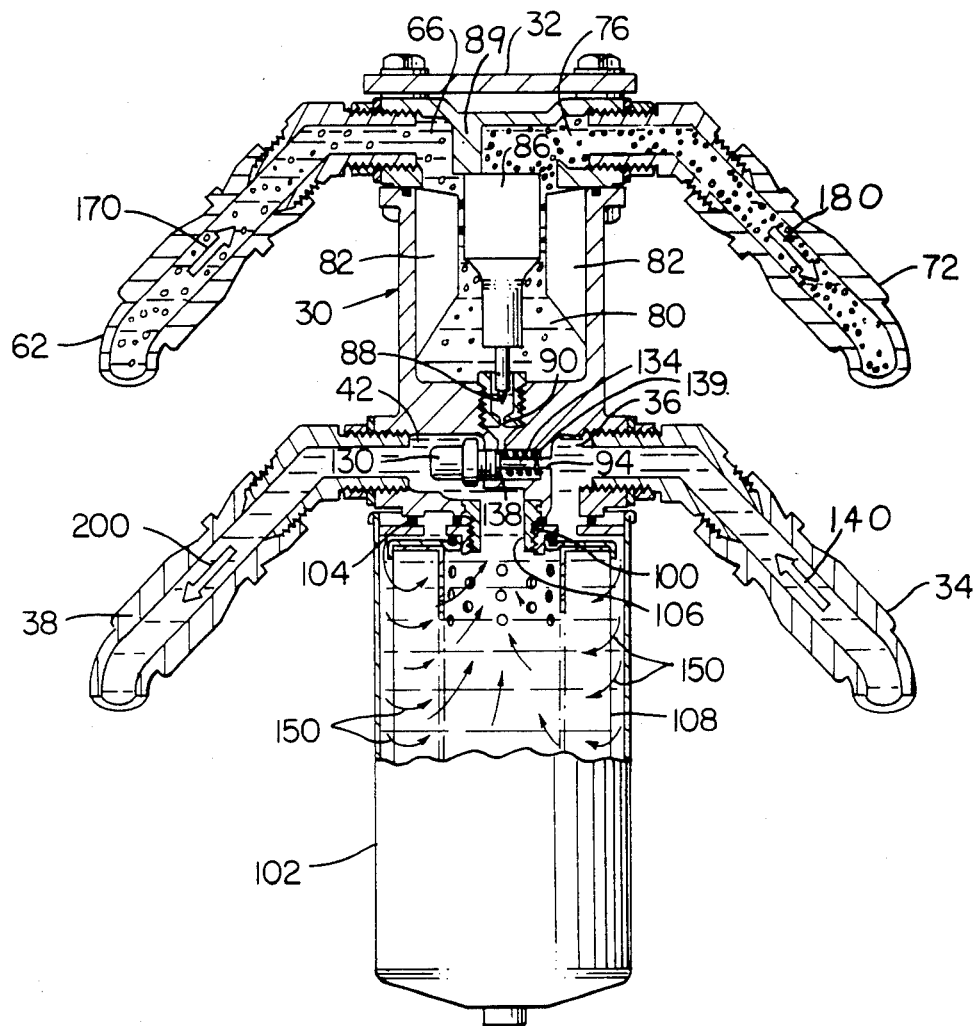
FIG. 4 is a cross-sectional diagrammatic type of view, similar to FIG. 2 and drawn on substantially the same scale as FIG. 2, illustrating the diesel fuel control apparatus of this invention in another of its operating modes.

During normal operation of the diesel engine 10, the mixture of heated fuel and entrained air therein fills the fuel control chamber 80, as illustrated in FIGS. 2 and 4. The density of the mixture of heated excess fuel and entrained air in the fuel control chamber 80 varies with operation of the diesel engine. The buoyant member 86 is in its lowermost position in the fuel control chamber 80, as illustrated in FIG. 2, when the density of the mixture of heated excess fuel and entrained air in the fuel control chamber 80 is low. A low density of the mixture indicates that the mixture has excess air therein.

When the buoyant member 86 is in its lowermost position, as illustrated in FIG. 2, the valve member 88 closes the passage 90, and all of the heated excess fuel and entrained air which enters the fuel control chamber 80, flows from the fuel control chamber 80 through passage 76 and into the conduit 72 and flows from the fuel control housing 30 in the conduit 72, as illustrated by an arrow 180 in FIG. 2. The excess fuel and air then flows in the conduit 72 to the fuel tank 24. The air is separated from the fuel in the fuel tank 24 and is permitted to escape from the fuel tank 24.

When the mixture of heated fuel and air in the fuel control chamber 80 has sufficient density, indicating that the air in the mixture is not excessive, the buoyant member 86 rises within the fuel control chamber 80, as illustrated in FIG. 4. When this occurs, the valve member 88 is lifted from the passage 90, and heated fuel is permitted to flow through the passage 90, into the passage 92, through the passage 94 and into the inlet passage 36, as illustrated in FIG. 4. Thus, heated fuel mixes in the inlet passage 36 with fuel flowing into the inlet passage 36 from the fuel tank 24 through the conduit 34, as illustrated in FIG. 4. The mixture of heated fuel and fuel flowing from the fuel tank 24 is, of course, at a higher temperature than the fuel flowing from the fuel tank 24. The fuel mixture has a temperature such that wax particles are not permitted to exist in the fuel mixture to cause clogging of the fuel filter element 108. The fuel mixture flows through the fuel filter element 108, through the passage 106, and through the outlet passage 42. Then the fuel flows through the conduit 38, as illustrated by an arrow 200 in FIG. 4, to the fuel pump 12, and then to the fuel injectors 56.

Figure 5:
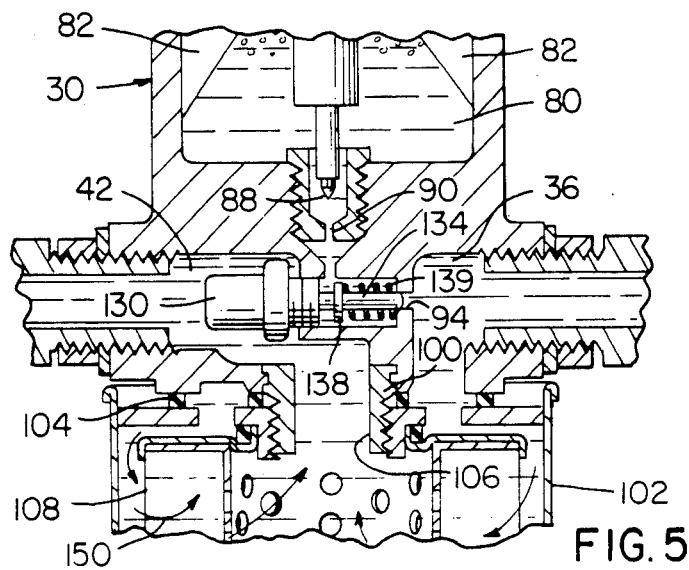
FIG. 5 is a fragmentary enlarged sectional view, drawn on a larger scale than FIG. 4, showing a portion of the diesel fuel control apparatus and fuel filter combination of this invention in another of its operating modes.

As the fuel flows through the outlet passage 42, the fuel engages the thermally responsive actuator 130. If the temperature of the fuel reaches a predetermined magnitude, the stem 134 of the thermally responsive actuator 130 is moved into the passage 94 and closes the passage 94, as illustrated in FIG. 5. It is to be noted that as the actuator stem 134 moves into the passage 94, the actuator stem 134 travels into the passage 94 to an extent dependent upon the temperature of the fuel flowing in the outlet passage 42. The actuator stem 134 does not engage an abutment to limit travel thereof. Therefore, no overtravel means is necessary with respect to the thermally responsive actuator 130.

When the actuator stem is within the passage 94, preventing fluid flow therethrough, heated fuel is prevented from flowing into the inlet passage 36 and is thus prevented from mixing with the fuel entering the passage 36 from the fuel tank 24. Thus, under these conditions all the fuel flowing through the filter element 108 is fuel which flows directly thereto from the fuel tank 24. Under these conditions, all of the heated fuel and entrained air which flows into the fuel control chamber 80 must flow from the fuel control chamber 80, through the conduit 72, to the fuel supply tank 24. As stated above, the air flowing to the fuel supply tank 24 through the conduit 72 is permitted to escape from the fuel supply tank 24. Thus, all fuel flowing from the fuel supply tank 24 through the conduit 34 is substantially free of air.

As shown and described, the thermally responsive actuator 130 is in a position to sense the temperature of the fuel after the fuel flows through the filter element 108. The thermally responsive actuator 130 controls flow of heated fuel from the fuel control chamber 80 for mixing with fuel which flows from the fuel tank 24. Therefore, the thermally responsive actuator 130 ensures that the fuel flowing into the fuel filter element 108 has a temperature of sufficient value so that wax crystallization cannot occur in the fuel flowing into the fuel filter element 108. Therefore, the temperature of the fuel flowing to the fuel filter element 108 does not permit clogging of the fuel filter element 108.

Therefore, it is to be understood that the fuel control apparatus and system of this invention provides means by which a relatively small unit attached to a diesel engine permits the diesel engine to use conventional diesel fuel during cold weather conditions. This invention also provides control of the temperature of the fuel flowing to the diesel engine.

Although the preferred embodiment of the diesel fuel control apparatus and system of this invention has been described, it will be understood that within the purview of this invention various changes may be made in the form, details, proportion and arrangement of parts, the combination thereof, and the mode of operation, which generally stated consist in a diesel fuel control apparatus and system within the scope of the appended claims.

The invention having thus been described, the following is claimed:

1. For use in a diesel system in which a diesel engine is supplied with fuel from a fuel supply tank and in which the diesel engine consumes a portion of the fuel supplied thereto and in which a mixture of excess heated fuel and entrained air flows from the diesel engine, the combination: a diesel fuel control housing adapted to be attached to a diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the diesel fuel control housing, there being a fuel control chamber whthin the fuel control housing, there being a fuel filter chamber within the fuel filter housing and a fuel filter element therewithin, the fuel control housing forming passage means for directing fuel from the fuel inlet passage into the fuel filter chamber of the fuel filter housing and for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passage means for directing a mixture of excess heated fuel and entrained air into the fuel control chamber from the diesel engine and passage means for directing air which is separated from the mixture from the fuel control housing, and a buoyantly operable valve member within the fuel control chamber of the fuel control housing and controlling flow of heated fuel from the fuel control chamber through the connecting passage and to the fuel inlet passage of the fuel control housing.

2. The combination of claim 1 in which the fuel control housing has a lower portion and in which the fuel filter housing is attached to the lower portion of the fuel control housing.

3. The combination of claim 1 in which the buoyantly operable valve member includes means for sensing the density of the mixture of excess heated fuel and entrained air within the fuel control chamber of the fuel control housing and operates in accordance with such density.

4. For use in a diesel system in which a diesel engine is supplied with fuel from a fuel supply tank and in which the diesel engine consumes a portion of the fuel supplied thereto and in which a mixture of excess heated fuel and entrained air flows from the diesel engine, the combination: a diesel fuel control housing adapted to be attached to a diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the diesel fuel control housing, there being a fuel control chamber within the fuel control housing, there being a fuel filter chamber within the fuel filter housing with a fuel filter element therewithin, the fuel control housing forming passage means for directing fuel from the fuel inlet passage into the fuel filter chamber of the fuel filter housing and for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passage means for directing a mixture of excess heated fuel and entrained air into the fuel control chamber from the diesel engine and passage means for directing air from the fuel control housing, a buoyantly operable valve member within the fuel control chamber of the fuel control housing and controlling flow of heated fuel from the fuel control chamber through the connecting passage and to the fuel inlet passage of the fuel control housing, and thermally responsive valve means within the fuel control housing for sensing the temperature of the fuel flowing in the fuel control housing and controlling flow of fuel from the fuel control chamber of the fuel control housing into the fuel inlet passage and into the fuel filter housing.

5. For use in a diesel system in which a diesel engine is supplied with fuel from a fuel supply tank and in which the diesel engine consumes a portion of the fuel supplied thereto and in which a mixture of excess heated fuel and entrained air flows from the diesel engine, the combination: a diesel fuel control housing adapted to be attached to a diesel engine, the fuel control housing having a fuel inlet passage for receiving fuel from the fuel supply tank, the fuel control housing having a fuel outlet passage for directing fuel from the fuel control housing to the diesel engine, a diesel fuel filter housing removably attached to the diesel fuel control housing and supported by the diesel fuel control housing, there being a fuel control chamber within the fuel control housing, there being a fuel filter chamber within the fuel filter housing with a fuel filter element therewithin, the fuel control housing forming passage means for directing fuel from the fuel inlet passage into the fuel filter chamber of the fuel filter housing and for directing fuel from the fuel filter chamber of the fuel filter housing into the fuel outlet passage of the fuel control housing, the fuel control housing forming a connecting passage between the fuel control chamber and the fuel inlet passage of the fuel control housing, the fuel control housing forming passage means for directing a mixture of excess heated fuel and entrained air into the fuel control chamber from the diesel engine and for directing air from the fuel control housing, and a buoyant member within the fuel control chamber of the fuel control housing and sensing the density of the mixture of excess heated fuel and entrained air, and a valve member attached to the buoyant member and controlling flow of heated fuel from the fuel control chamber through the connecting passage and to the fuel inlet passage in accordance with operation of the buoyant member.

6. For use in a diesel system in which a diesel engine is supplied with fuel from a fuel supply tank and in which the diesel engine consumes a portion of the fuel supplied thereto and in which a mixture of excess heated fuel and entrained air flows from the diesel engine, the combination: a diesel fuel control housing adapted to be attached to a diesel engine, the fuel control housing having a fuel inlet passage for receiving fuel from the fuel supply tank, the diesel fuel control housing having a fuel outlet passage for directing fuel from the fuel control housing to the diesel engine, the diesel fuel control housing being adapted to have a diesel fuel filter housing removably attached thereto and supported by the diesel fuel control housing, there being a fuel control chamber within the fuel control housing, there being a fuel filter chamber within the fuel filter housing with a fuel filter element therewithin, the fuel control housing having therein a passage for directing fuel from the fuel inlet passage into the fuel filter chamber of the fuel filter housing and a passage for directing fuel from the fuel filter chamber of the fuel filter housing into the fuel outlet passage of the fuel control housing, the fuel control housing having a connecting passage between the fuel control chamber and the fuel inlet passage of the fuel control housing, the fuel control housing having a passage for directing a mixture of excess heated fuel and entrained air into the fuel control chamber from the diesel engine and a passage for directing air from the fuel control housing, a buoyant member within the fuel control chamber of the fuel control housing and sensing the density of the mixture of excess heated fuel and entrained air, and a valve member attached to the buoyant member and controlling flow of heated fuel from the fuel control chamber through the connecting passage and to the fuel inlet passage in accordance with operation of the buoyant member.

7. For use in a diesel system in which a diesel engine is supplied with fuel from a fuel supply tank and in which the diesel engine consumes a portion of the fuel supplied thereto and in which a mixture of excess heated fuel and entrained air flows from the diesel engine, the combination: a diesel fuel control housing adapted to be attached to a diesel engine, the fuel control housing having a fuel inlet passage of receiving fuel from the fuel supply tank, the diesel fuel control housing having a fuel outlet passage for directing fuel from the fuel control housing to the diesel engine, the diesel fuel control housing being adapted to have a diesel fuel filter housing removably attached thereto and supported by the diesel fuel control housing, there being a fuel control chamber within the fuel control housing, there being a fuel filter chamber within the fuel filter housing with a fuel filter element therewithin, the fuel control housing having therein a passage for directing fuel from the fuel inlet passage into the fuel filter chamber of the fuel filter housing and a passage for directing fuel from the fuel filter chamber of the fuel filter housing into the fuel outlet passage of the fuel control housing, the fuel control housing having a connecting passage between the fuel control chamber and the fuel inlet passage of the fuel control housing, the fuel control housing having a passage for directing a mixture of excess heated fuel and entrained air into the fuel control chamber from the diesel engine and a passage for directing air from the fuel control housing, a buoyant member within the fuel control chamber of the fuel control housing and sensing the density of the mixture of excess heated fuel and entrained air, and a valve member attached to the buoyant member and controlling flow of heated fuel from the fuel control chamber through the connecting passage and to the fuel inlet passage in accordance with operation of the buoyant member, and thermally responsive valve means within the fuel control housing for sensing the temperature of the fuel flowing in the fuel outlet passage of fuel control housing and controlling flow of fuel from the fuel control chamber through the connecting passage into the fuel inlet passage of the fuel control housing.

* * * * *

UNITED STATES PATENT AND TRADEMARK OFFICE
CERTIFICATE OF CORRECTION

PATENT NO. : 4,502,451
DATED : March 5, 1985
INVENTOR(S) : Wayne R. Duprez

It is certified that error appears in the above-identified patent and that said Letters Patent are hereby corrected as shown below:

Column 1, line 17, change "temperature" to ---temperatures---.

Column 4, line 16, change "34" to ---134---.

Column 6, line 29, change "whthin" to ---within---.

Signed and Sealed this

Twenty-third Day of July 1985

[SEAL]

Attest:

DONALD J. QUIGG

Attesting Officer       Acting Commissioner of Patents and Trademarks